Nov. 3, 1959    R. KURZ    2,911,245
JOINT

Filed May 31, 1957    2 Sheets-Sheet 1

Inventor.
Rudolf Kurz
By Michael S. Striker
agt.

Nov. 3, 1959 R. KURZ 2,911,245
JOINT
Filed May 31, 1957 2 Sheets-Sheet 2

Inventor.
Rudolf Kurz
By Michael S. Striker

United States Patent Office 2,911,245
Patented Nov. 3, 1959

2,911,245
JOINT

Rudolf Kurz, Bissingen (Enz), Germany

Application May 31, 1957, Serial No. 662,935

Claims priority, application Germany October 3, 1956

3 Claims. (Cl. 287—99)

The present invention relates to joints.

More particularly, the present invention relates to that type of joint where a pair of members are turnably connected one to the other so that the members can be turned one with respect to the other between collapsed and expanded positions.

With an arrangement of this type, the joint usually forms part of a device having a pair of components turnable with respect to each other between collapsed and expanded positions. For example, such a joint may be used in a folding bed where a head part or a foot part or both of these parts are turnable with respect to a central part of the bed between expanded and collapsed positions. With such arrangements a pawl and ratchet may be used for locating the parts in an adjusted angular position with respect to each other, and when turning the parts from a collapsed to an expanded position it is necessary to release the pawl so as to be able to turn the parts with respect to each other in the desired direction. This usually requires one hand of the operator to hold the pawl in a released position and the other hand of the operator to turn the part, and as a consequence it is necessary for the operator to use both hands to turn the parts and the operation is inconvenient to carry out quickly and easily.

One of the objects of the present invention is to provide a joint of the above type which enables the operator to ignore the pawl and ratchet or the like while turning the parts from their collapsed to their expended position, for example.

Another object of the present invention is to provide in a joint of the above type a pawl and ratchet mechanism which is capable of automatically positioning itself in an inoperative position where the pawl will not cooperate with the ratchet whenever the parts are turned to their collapsed position.

A further object of the present invention is to provide an arrangement of the above type wherein a pawl and ratchet are capable of automatically moving themselves into an operative position when the parts are moved one with respect to the other to an expanded position.

An additional object of the present invention is to provide a structure which is capable of accomplishing all of the above objects and at the same time composed of simple and ruggedly constructed elements which are very reliable in operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 6:
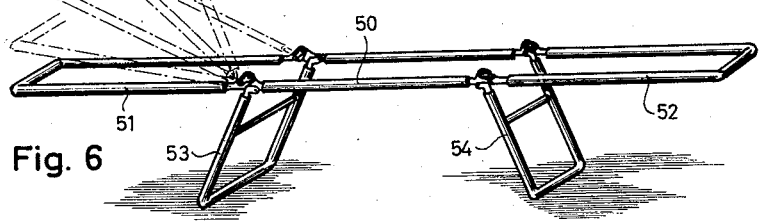
Figure 7:
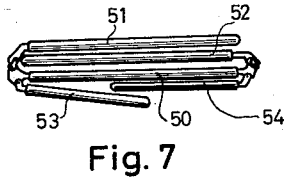

Fig. 6 diagrammatically illustrates how a collapsible bed using the joint of the invention operates; and Fig. 7 shows the bed of Fig. 6 in its collapsed position.

Referring now to the drawings and to Figs. 1—5 in particular, the joint of the invention is shown as made up of a pair of members one of which is generally designated by the reference character 10 and the other which is generally designated by the reference character 11. The member 10 is a ratchet-carrying member and the member 11 is a pawl-carrying member. A pivot means 18 interconnects these members for turning movement one with respect to the other about the axis of the pivot pin 18 between the expanded position shown in Fig. 1 and the collapsed position shown in Fig. 2.

Figure 1:
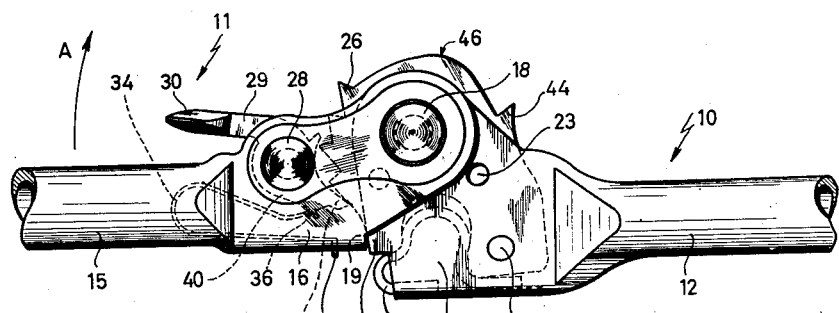
Fig. 1 is a side elevational view of a joint according to the present invention, the joint being shown in Fig. 1 in its expanded position.
Figure 3:
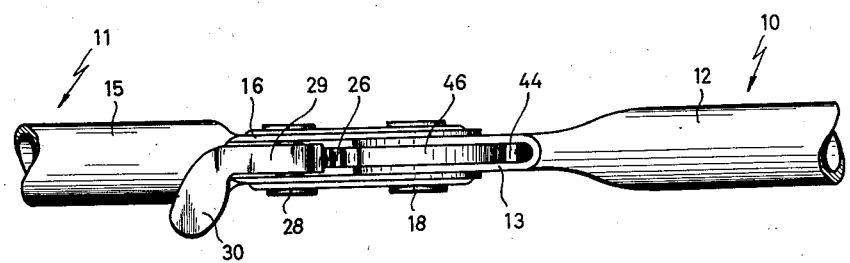
Fig. 3 is a top plan view of the structure of Fig. 1.

The member 10 has a tubular portion 12 which at its left end is bifurcated so as to be provided with a pair of side walls 13, and the member 11 has a tubular portion 15 which at its right end, as viewed in Fig. 1, is bifurcated so as to be provided with a pair of side walls 16, the side walls 13 being received between the side walls 16, as is particularly evident from Fig. 3. All of the side walls are formed with aligned bores through which the pivot pin 18 passes, and this pivot pin 18 is provided with enlarged ends greater than the diameter of the aligned openings of the walls 13 and 16 so that the pin 18 cannot shift axially. Thus, the above-described pivot means interconnects the members 10 and 11 for turning movement one with respect to the other. The element 11 has a lower right end portion 19, as viewed in Fig. 1, which engages a lower left end portion 20 of the element 10, as viewed in Fig. 1, so as to determine the expanded position of the parts. Thus, the portions 19 and 20 act as stops respectively carried by the pawl-carrying member 11 and the ratchet-carrying member 10 for determining the expanded position of the members.

The ratchet carrying member 10 fixedly carries between the walls 13 thereof a ratchet 22. This ratchet is fixed in position by being provided in its opposite faces with a pair of recesses, a pair of recesses being located in each of these opposite faces of the ratchet 22, and the side walls 13 are each provided with a pair of indentations 23 respectively extending into the recesses of the ratchet so as to fix the latter in position on the ratchet-carrying member 10. Furthermore, it will be noted that the ratchet member 22 is provided with a cutout into which a curved portion of a leaf spring 25 extends, this leaf spring being located between the walls 13 and having a lower left portion projecting beyond the walls 13. This leaf spring 25 is used to releasably maintain another turnable member pivotally connected to the member 10 by a pivot pin extending through the aligned openings 14 of the walls 13 so as to maintain this member in an expanded position. Such a member is described below in connection with Figs. 6 and 7.

The ratchet 22 is provided with a plurality of ratchet teeth 26 which are distributed about the axis of the pivot pin 18, and a pawl 29 is carried by the pawl-carrying member 11 and cooperates with these ratchet teeth. The pawl 29 is movably carried by the pawl-carrying member 11 for movement between an operating position where the pawl 29 cooperates with the teeth 26 of the ratchet 22 and a non-operating position where the pawl 29 will not engage the teeth of the ratchet during turning of the members 10 and 11 one with respect to the other. Thus, the pawl 29 is located between the walls 16 of the pawl-carrying member 11, and a pivot pin 28 connects the pawl 29 to the member 11 for turning movement with respect to the latter about an axis parallel to that of the pivot pin 18. The pawl 29 is capable of being turned about the pivot pin 28 between the operating position of the pawl shown in Fig. 1 and the non-operating position of the pawl shown in Figs. 2 and 4. A handle 30 is fixed to the pawl 29 and extends therefrom, this handle 30 being accessible to the operator so that the operator may turn the pawl 29 about the pivot pin 28 between the operating and non-operating positions of the pawl 29.

A means is provided for releasably maintaining the pawl 29 in its non-operating position, and this means includes a structure which releasably maintains the tooth 32 of the pawl spaced sufficiently from the axis of the pin 18 so that this tooth 32 will not engage the teeth 26 of the ratchet 22 and will not move into any of the gaps between the teeth 26. This pawl-positioning means for positioning the pawl in its non-operating position includes a leaf spring 34 which also serves to urge the tooth 32 of the pawl toward the teeth 26 of the ratchet 22. The leaf spring 34 is fixed at its end 35 to the pawl-carrying member 11 as by having this end 35 extend through an opening in the wall of the member 11. The leaf spring 34 has a free end 36 which is of a substantially V-shaped configuration and which engages the edge of the pawl 29 which is directed away from the ratchet 22 for urging the tooth 32 of the pawl toward the ratchet 22. This edge of the pawl 29 is formed with a notch 37 of substantially V-shaped configuration, and when the pawl 29 is turned to its non-operating position the free end 36 of the spring 34 is located in the notch 37, as is indicated most clearly in Fig. 4. When the pawl 29 has the position shown in Fig. 4 the free end of the spring 34 presses the pawl 29 toward the pivot pin 28 and does not urge the pawl to turn in a counterclockwise direction, as viewed in Fig. 4, about the pivot pin 28, so that in this way the pawl 29 is maintained in the non-operating position thereof shown in Fig. 4. However, when the pawl 29 is turned to the position indicated in Figs. 1 and 5, the free end 36 of the spring 34 cooperates with the edge of the pawl 29 which is directed away from the ratchet 22 to urge the pawl 29 to turn in a counterclockwise direction, as viewed in Fig. 5, so that in this way the tooth 32 of the pawl is urged toward the teeth 26 of the ratchet so as to enter the gaps between these teeth for releasably maintaining the joint in an adjusted angular position. The edge of the pawl 29 with which the spring 34 cooperates is indicated at 40.

Figure 5:
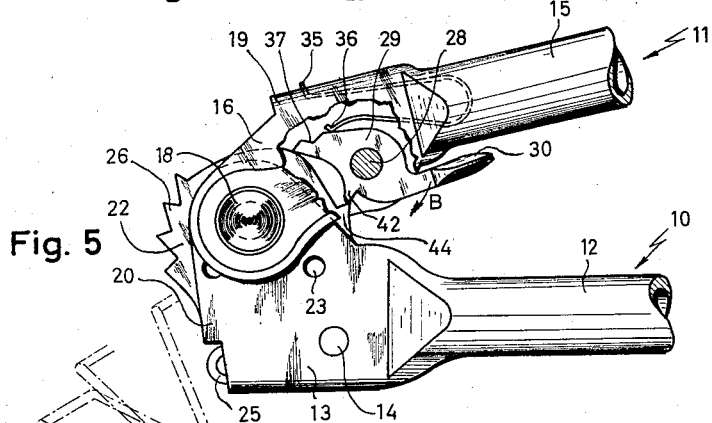
Fig. 5 shows the parts just before they have reached the collapsed position of Fig. 2, Fig. 5 showing how a pawl is automatically moved from an operating to a nonoperating position.
Figure 2:
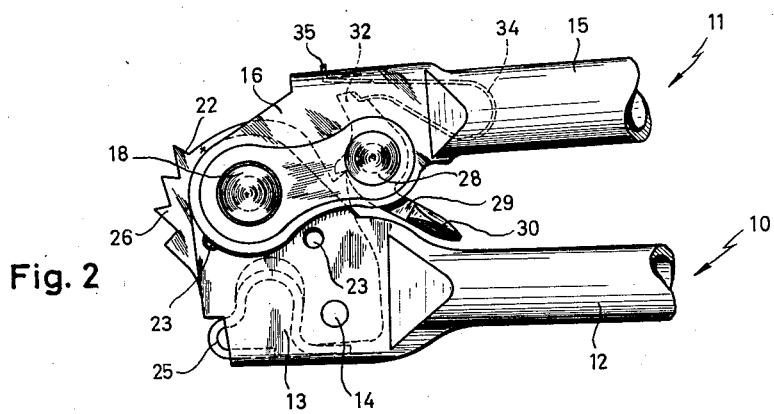
Fig. 2 shows the joint of the invention with the parts thereof located in the collapsed position.

In accordance with the present invention the pawl 29 is provided with a pawl projection 42. Also, the ratchet-carrying member 10 is provided with a pawl-moving projection 44. The pawl-moving projection 44 which is fixedly carried by the ratchet-carrrying member 10 forms part of the ratchet 22 in the illustrated embodiment. The ratchet 22 furthermore is provided between the last of the ratchet teeth 26 and the projection 44 with a camming edge 46. As the members 10 and 11 are turned one with respect to the other from the expanded position of Fig. 1 to the collapsed position of Fig. 2 the tooth 32 cooperates with the camming edge 46 of the ratchet 22 in the manner illustrated in Fig. 5 so as to locate the pawl projection 42 in a position where it will engage the projection 44, as indicated in Fig. 5. It will be noted that when the pawl-carrying member 11 is turned in direction of arrow A of Fig. 1 toward the position indicated in Fig. 5 the projections 42 and 44 will not engage each other until the pawl has moved beyond the last of the ratchet teeth 26. As the member 11 is turned in the direction of arrow B of Fig. 5 from the position of Fig. 5 to that of Fig. 2 the projections 42 and 44 cooperate with each other to turn the pawl 29 in a clockwise direction, as viewed in Fig. 5, with respect to the pawl-carrying member 11 until the free end 36 of the spring 34 becomes located in the notch 37, as indicated in Fig. 2, so that in this way the pawl 29 is automatically turned to its non-operating position to be releasably maintained in this position by the cooperation of the spring 34 with the notch 37. Thus, the elements 42 and 44 form a means for automatically moving the pawl 29 from its operating to its non-operating position when the members 10 and 11 are moved one with respect to the other from their expanded to their collapsed position after the pawl has moved beyond the last of the ratchet teeth and before the members 10 and 11 have reached their collapsed position.

Figure 4:
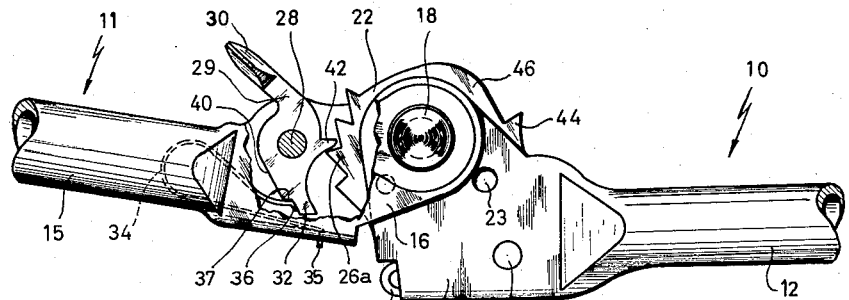
Fig. 4 shows the position which the parts assume just before they reach their expanded position, Fig. 4 illustrating how a pawl is automatically moved from a nonoperating to an operating position.

Assuming that the members 10 and 11 are in the collapsed position of Fig. 2 where they are located beside each other and that they are turned one with respect to the other toward their expanded position where they respectively extend in opposite directions from the axis of the pivot pin 18, it will be seen that as the member 11 is turned from the position of Fig. 2 toward that of Fig. 1 the tooth 32 will not engage the teeth 26 so that there is no resistance to the turning of the member 11 with respect to the member 10 at this time. Just before the member 11 has reached its expanded position with respect to the member 10, the projection 42 engages the second tooth 26a of the ratchet 22, as indicated in Fig. 4, since the distance of the crest of tooth 26a from the axis of the pivot pin 18 is greater than the distance of the free end of projection 42 from this axis, and it will be noted that at this time the tooth 32 is located beyond the first tooth 26 of the ratchet 22. It should be further noted that the crests of the tooth 26, above the tooth 26a, are located closer to the axis of pivot pin 18 than the crest of tooth 26a, so that tooth 26 will not engage the projection 42 during the turning of the member 11. The second tooth 26a of the ratchet 22 cooperates with the projection 42 to turn the pawl 29 with respect to the member 11 which is approaching its expanded position in a counterclockwise direction, as viewed in Fig. 4, so as to turn the notch 37 beyond the free end 36 of the spring 34 and in this way just before the members 10 and 11 reach their expanded position the pawl 29 is automatically moved from its non-operating position to its operating position where the spring 36 cooperates with the edge 40 of the pawl to urge the tooth 32 thereof toward the ratchet 22, as is indicated in Fig. 1 which shows the position of the parts when they have reached their expanded position. Thus, the single projection 42 of the pawl 29 contributes both to the automatic moving of the pawl from its operating to its non-operating position and to the automatic moving of the pawl from its non-operating to its operating position. When the member 11 is again turned in the direction of arrow A of Fig. 1, the pawl 29 will click along the teeth 26 and the turning of the member 11 may be stopped when it has reached any desired inclination with respect to the member 10 and the pawl will be located between a pair of the teeth 26 so as to maintain the joint in the adjusted angular position. Of course, if it is desired at any time to move the member 11 back toward the position thereof shown in Fig. 1 without first moving the member 11 all the way to its collapsed position shown in Fig. 2, the operator may engage the handle 30 so as to turn the pawl 29 to its non-operating position, and then the member 11 may freely be turned back toward its expanded position.

Figs. 6 and 7 show how the joints may be used in a folding bed construction of which only the frame is illustrated in Figs. 6 and 7. Thus, the folding bed includes a central frame part 50 having a pair of side tubular members. Each of these side members is turnably connected at its ends respectively to a pair of the members 10. In other words, four joints of the invention are used in the folding bed of Fig. 6, and these joints are respectively connected to the ends of the pair of tubular side members of the central part 50 of the bed. A head member 51 of the bed frame has a pair of side portions respectively fixedly connected to the members 11 of the pair of left joints of Fig. 6, while a foot part 52 of the frame has a pair of side members respectively connected to the pair of members 11 of the pair of right joints shown in Fig. 6. A pair of foot members 53 and 54 are each provided with a pair of side parts, and these side parts are respectively fixed to elements which are turnably connected to the members 10 of the several joints. Thus, the elements connected to the frame parts 53 and 54 are respectively turnably connected to the parts 10 by pivot pins which pass through the aligned openings 14 of the walls 13 referred to above. These elements have portions which snap over the left lower portion of the spring 25, as viewed in Fig. 1, so that the leg parts 53 and 54 are releasably maintained in their expanded position shown in Fig. 6, and these parts 53 and 54 may simply be turned from the position of Fig. 6 to that of Fig. 7. The head part 51 and the foot part 52 may also be turned from the position of Fig. 6 to that of Fig. 7, the latter figure showing the bed in its collapsed position. Fig. 6 shows in dot-dash lines the several adjustable positions of the head part 51, these adjustable positions corresponding to the several positions in which the pawls 29 of the left joint of Fig. 6 respectively cooperate with the teeth 26 of the ratchets of these left joints. In the same way the foot part 52 may have its inclination adjusted with the joints of the invention. It is apparent that when the bed is in the collapsed position shown in Fig. 7, it is necessary for the operator only to move out the foot parts 53 and 54 so as to rest the bed on a floor or the like, and then the head part 51 and thereafter the foot part 52 may simply be turned to the expanded position shown in solid lines in Fig. 6, and the pawl and ratchet mechanisms will not in any way interfere with its movement. On the other hand, whenever the head part or foot part are turned upwardly the pawl and ratchet are automatically in their operating position where they cooperate to maintain the head or foot part in adjusted angular position.

It is to be noted that while in the above description turning of the pawl-carrying part 11 with respect to the ratchet-carrying part 10 has been discussed, it is of course possible for the pawl-carrying part 11 to remain stationary and for the ratchet-carrying part 10 to be turned with respect to the pawl-carrying part 11, or both of these parts may be simultaneously turned with respect to each other.

All of the above-described elements may be made of any suitable material such as any desired metal, for example.

The joint structure described above is capable of being used in the folding bed disclosed in my copending application entitled "Folding Bed" and filed simultaneously herewith.

It will be understood that each of the elements described above, or two or more together, may also find a useful application in other types of joints differing from the types described above.

While the invention has been illustrated and described as embodied in adjustable joints, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of priort art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A joint comprising, in combination, a pawl-carrying member and a ratchet-carrying member; pivot means interconnecting said members for turning movement one with respect to the other about a given axis between a collapsed position where said members are located beside each other and an expanded position where said members extend respectively in different directions from said axis; a ratchet fixedly carried by said ratchet-carrying member and having ratchet teeth distributed about said axis; a pawl movably carried by said pawl-carrying member for movement between an operating position cooperating with said ratchet and a non-operating position where said pawl does not engage said ratchet during turning of said members one with respect to the other about said axis, said pawl having an edge directed away from said ratchet and formed with a notch; a leaf spring carried by said pawl-carrying member and having a free end engaging said edge of said pawl for urging the latter toward said ratchet when said pawl is in said operating position thereof, said pawl being manually movable to said non-operating position thereof and said free end of said spring being located in said notch when said pawl is in said non-operating position thereof for releasably maintaining said pawl in said non-operating position thereof; and a pawl moving projection carried by said pawl and engaging one of said ratchet teeth during turning of said members one with respect to the other from said collapsed to said expanded position thereof for moving said pawl from said non-operating to said operating position thereof after said pawl has moved beyond the first of said ratchet teeth and before said members have reached their expanded position.

2. A joint comprising, in combination, a pawl-carrying member and a ratchet-carrying member; pivot means interconnecting said members for turning movement one with respect to the other about a given axis between a collapsed position where said members are located beside each other and an expanded position where said members extend respectively in different directions from said axis; a ratchet fixedly carried by said ratchet-carrying member and having ratchet teeth distributed about said axis; a pawl movably carried by said pawl-carrying member for movement between an operating position cooperating with said ratchet and a non-operating position where said pawl does not engage said ratchet during turning of said members one with respect to the other about said axis, said pawl having an edge directed away from said ratchet and formed with a notch; a leaf spring carried by said pawl-carrying member and having a free end engaging said edge of said pawl for urging the latter toward said ratchet when said pawl is in said operating position thereof, said pawl being manually movable to said non-operating position thereof and said free end of said spring being located in said notch when said pawl is in said non-operating position thereof for releasably maintaining said pawl in said non-operating position thereof; a pawl moving projection carried by said pawl and engaging one of said ratchet teeth during turning of said members one with respect to the other from said collapsed to said expanded position thereof for moving said pawl from said non-operating to said operating position thereof after said pawl has moved beyond the first of said ratchet teeth and before said members have reached their expanded position; and a pawl moving projection carried by said ratchet-carrying member and engaging said pawl projection during turning of said members one with respect to the other from said expanded to said collapsed position thereof and after said pawl has moved beyond the last of said ratchet teeth for automatically moving said pawl from said operating to said non-operating position thereof before said members reached their collapsed position.

3. A joint comprising, in combination, a pawl-carrying member and a ratchet-carrying member; pivot means interconnecting said members for turning movement one with respect to the other about a given axis between a collapsed position where said members are located beside each other and an expanded position where said members extend respectively in different directions from said axis; a ratchet fixedly carried by said ratchet-carrying member and having ratchet teeth distributed about said axis; a pawl movably carried by said pawl-carrying member for movement between an operating position cooperating with said ratchet and a non-operating position where said pawl does not engage said ratchet during turning of said members one with respect to the other about said axis; means carried by said pawl-carrying member and cooperating with said pawl for releasably maintaining the same in said non-operating position thereof; and a pawl projection carried by said pawl and engaging the second one of said ratchet teeth during turning of said members from said collapsed to said expanded position thereof one with respect to the other for automatically turning said pawl from said non-operating to said operating position thereof after said pawl has moved beyond the first of said ratchet teeth and before said members have reached their expanded position.

References Cited in the file of this patent

UNITED STATES PATENTS

| | | |
|---|---|---|
| 778,720 | Drury | Nov. 1, 1904 |
| 901,700 | Filson | Oct. 20, 1908 |
| 1,226,324 | Gage | May 15, 1917 |
| 1,547,093 | Burch | July 21, 1925 |
| 1,755,486 | Odell | Apr. 22, 1930 |
| 2,001,507 | Stribling | May 14, 1935 |